United States Patent [19]

Marano

[11] 4,076,480
[45] Feb. 28, 1978

[54] MANDREL DESIGN FOR BAGEL MAKING MACHINE

[75] Inventor: John Francis Marano, Rosemead, Calif.

[73] Assignee: Kotten Machine Co. of Calif. Inc., South El Monte, Calif.

[21] Appl. No.: 712,599

[22] Filed: Aug. 9, 1976

[51] Int. Cl.² .................................................. A21C 11/00
[52] U.S. Cl. .................................................... 425/364 B
[58] Field of Search ........................ 425/364 B, 364 R

[56] References Cited

U.S. PATENT DOCUMENTS

| 1,552,430 | 9/1925 | Gendler | 425/364 B |
| 3,491,704 | 1/1970 | Thompson | 425/364 B |
| 3,862,818 | 1/1975 | Atwood | 425/364 B X |
| 3,880,567 | 4/1975 | Raichel | 425/364 B |

Primary Examiner—Francis S. Husar
Assistant Examiner—William R. Briggs
Attorney, Agent, or Firm—Spensley, Horn & Lubitz

[57] ABSTRACT

A mandrel design for use in a machine which forms a toroid of a plastic material such as bagel dough, including a tapered plate having a wide end and a narrow end. The tapered plate is oriented so that the plastic material encounters the wide end of the tapered plate first. The wide end of the tapered plate gradually fairs into the shape of the underside of the mandrel such that the combination of the mandrel and tapered plate presents a smooth surface to the plastic material as it travels beneath the tapered plate and mandrel joint.

4 Claims, 7 Drawing Figures

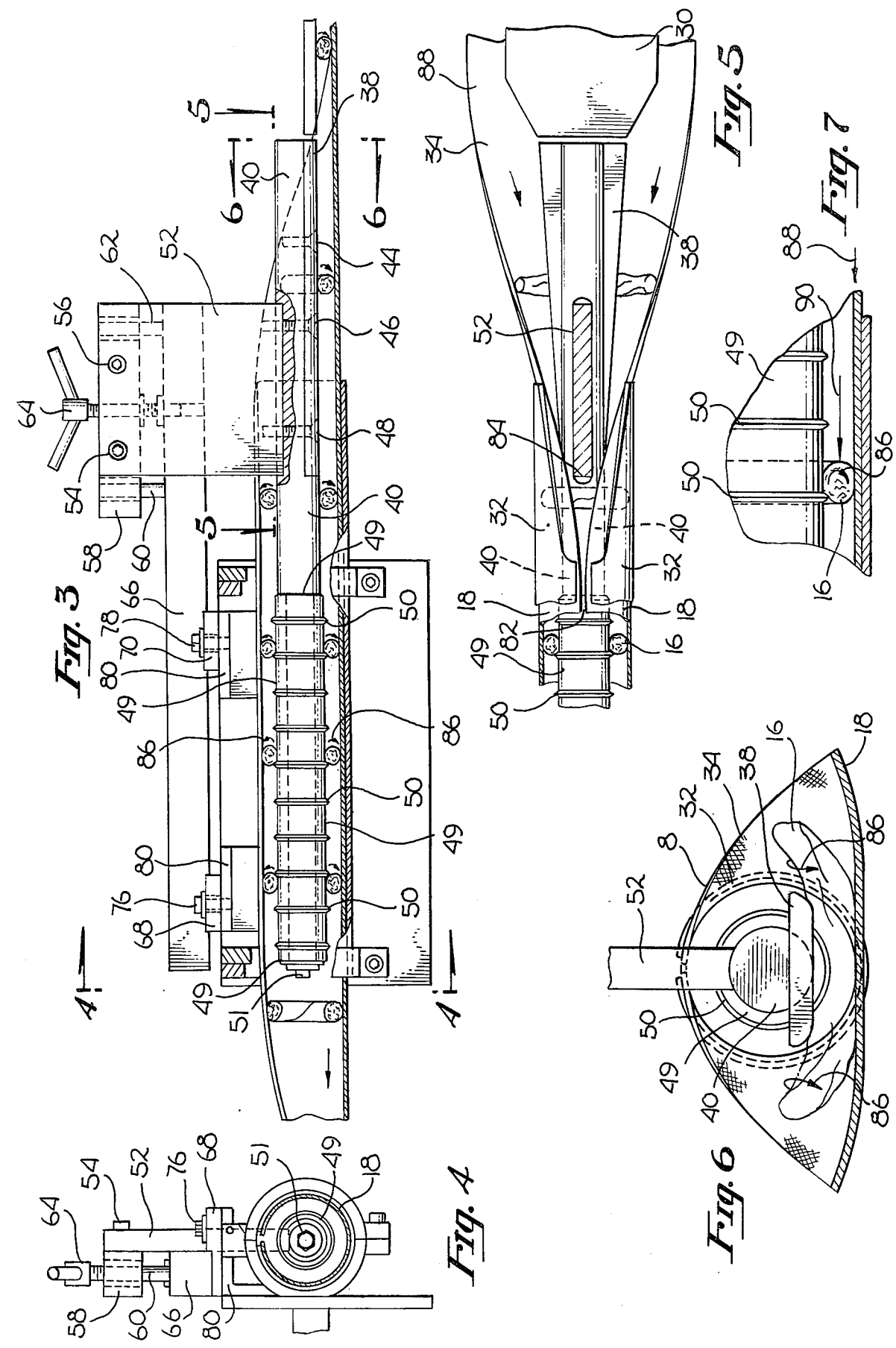

MANDREL DESIGN FOR BAGEL MAKING MACHINE

BACKGROUND OF THE INVENTION

1. Field of the Invention

This invention relates to the field of machines used to form toroids from plastic material, and more specifically to the mandrels which are commonly used in such machines.

2. Description of the Prior Art

There are many prior art devices which form toroids of plastic material such as dough. Some devices use a mandrel to form the hole in the center, in some cases the lump of dough is impaled on a pointed mandrel to form the hole, and in other cases the toroid is formed by two hinged mold halves.

The pertinent art includes the following patents:

| Patent No. | Inventor | Issue Date |
|---|---|---|
| 3,031,979 | D. T. Thompson | 5/1/62 |
| Re. 25,536 | D. T. Thompson | 3/10/64 |
| 3,247,808 | D. T. Thompson | 4/26/66 |
| 3,371,624 | D. T. Thompson | 3/5/68 |
| 3,379,142 | B. W. Reiter et al. | 4/23/68 |
| 3,433,182 | M. Thompson | 3/18/69 |
| 3,491,704 | Daniel T. Thompson | 1/27/70 |
| 3,580,385 | Daniel T. Thompson | 5/25/71 |
| 2,779,298 | F. Chwirut et al. | 1/29/57 |
| 3,080,831 | H. Paitchell et al. | 3/12/63 |
| 3,115,103 | G. Huss | 12/24/63 |
| 3,315,618 | E. I. Groff | 4/25/67 |
| 3,407,754 | L. Wichinsky | 10/29/68 |
| 1,552,430 | L. Gendler | 9/8/25 |
| 1,755,921 | L. Gendler | 4/22/30 |
| 2,584,514 | M. Thompson et al. | 2/5/52 |
| 2,611,329 | R. M. Lehman | 9/23/52 |
| 2,628,578 | E. J. Roth | 2/17/53 |
| 2,666,398 | L. Gendler et al. | 1/19/54 |

The Reiter et al. U.S. Pat. No. 3,379,142 discloses a pair of endless chains spaced vertically one above the other so that the upper run of the lower chain and the lower run of the upper chain run parallel to one another and each carry a half mold for the external shape of bagel. Disposed between the upper and lower molds is a forming mandrel which extends longitudinally between the molds for the length of their horizontal run during which the two mold halves form a complete mold, with the mandrel then turning downward about the sprocket of the lower mold run as the upper mold sections are separated upward and away from the lower mold section. The Rieter apparatus has means for dropping a ball of bagel dough downward by gravity into a lower mold which carries the dough beneath the central mandrel into the region where the upper mold comes downward and forms a complete mold with the lower mold section and with the mandrel enclosed therewithin. The ball of dough is rolled around the mandrel and formed as it progresses longitudinally from one end of the closed mold section to the other end. The first eight claims of this patent specifically set forth the two endless chains and the upper and lower mold sections. Claim 9 of this patent claims only the mandrel which is specifically shown and described in this patent. The mandrel is shown in FIG. 2 and includes the sections 64a, 64b and 64c which are successive forming sections for the bagel and are of successively increasing diameter. This successively increasing diameter of the three forming sections is clearly described in the specification and is set forth in claim 9.

U.S. Pat. No. 3,031,979 to Thompson has been reissued as reissue patent Re. 25,536 and covers apparatus which includes a central mandrel having a sharp point at its free end upon which a lump of bagel dough is impaled to provide the central bagel hole, and the lump is then enclosed in a form which has hinged side walls that are closed inward about the lump to roll the lump along the mandrel and form the finished bagel. The claims of this reissue patent all include a limitation in one form or another which sets forth the impaling of the dough lump upon the central mandrel. U.S. Pat. No. 3,247,808 is a divisional patent derived from the original reissued U.S. Pat. No. 3,031,979, and which covers the method of making a bagel as disclosed in the reissue patent 25,536 just described. The method of course includes the step of impaling the ball of bagel dough on the pointed end of an elongated rod or mandrel.

The 1971 U.S. Pat. to Thompson No. 3,580,385 describes and claims a transport apparatus for conveying lumps of dough to a bagel making machine but does not cover a bagel making machine itself.

The 1970 U.S. Pat. to Thompson No. 3,491,704 illustrates and describes a bagel forming machine having a mold made of a fixed bottom form and a pair of side forms which are moved together to complete a toroid and are opened up to release the formed product. The machine utilizes a strip of bagel dough which is laid in the mold and is then wrapped about a central mandrel by the reaction of the inwardly pivoted sides of the mold as they come together.

The 1969 U.S. Pat. No. 3,433,182 to Meyer Thompson is another apparatus which forms a bagel from a strip of bagel dough, the sequence being shown most clearly in the FIG. 17 of the drawings, while the apparatus is perhaps best seen in FIGS. 12 through 15 of the drawngs. This apparatus is again similar to the just described Thompson U.S. Pat. No. 3,491,704.

The 1968 U.S. Pat. No. to Thompson 3,371,624 deals generally with an apparatus having a two part hinged sleeve mold structure with a mandrel which moves axially within the sleeve.

The 1968 U.S. Pat. No. to Wichinsky 3,407,754 is a very simple apparatus for making bagels which essentially starts with a lump of dough carried on a conveyor under a forming device to convert the lump into an elongated cylindrical strip, which strip is then carried along by the conveyor into a region where the conveyor itself is turned upwards at both sides into a cylindrical shape by means of a tubular sleeve. A central mandrel running through the tubularly formed portion of the conveyor provides a form about which the strip of dough is turned upward and about to form a completed bagel which is discharged at the opposite end of the conveyor after the latter has returned back to its flat shape. All of this is rather clearly illustrated in the single figure of the Wichinsky patent.

The 1967 U.S. Pat. No. to Groff 3,315,618 is a machine for making circular pretzels. The apparatus as disclosed requires the use of elongated cylindrical strips of dough which are draped about a mandrel in inverted U-shape and then have their drooping ends pushed inward and around the mandrel and pressed together to form an annulus.

The 1963 U.S. Pat. No. to Huss 3,115,103 is directed toward the formation of an elongated roll of the hot dog type from an initial dough ball or lump.

The 1963 U.S. Pat. No. to Paitchell 3,080,031 forms bagels from a lump of dough by first impaling the lump on the tip of a cylindrical mandrel, and then rolling the impaled lump upward along the mandrel by means of endless belts to form a finished bagel ring.

The 1957 U.S. Pat. No. to Chwirut 2,779,298 discloses and sets forth in the two claims of the patent an apparatus for extruding a tube of dough and thereafter slicing the tube after extrusion to form rings of dough and to thereafter manipulate the rings so as to form a bagel type torus.

The 1925 Gendler U.S. Pat. No. 1,552,430 discloses an apparatus very much like the Wichinsky U.S. Pat. No. 3,407,754, the basic difference being that Wichinsky shows a former for taking a dough lump and converting it into the strip of dough which is to be formed into the bagel, whereas Gendler does not show such a forming device but starts off with dough strips.

The 1930 patent to Gendler U.S. Pat. No. 1,755,921 again deals with strips of dough which are formed into a bagel.

The 1952 U.S. Pat. No. to Meyer Thompson 2,584,514 is another example of bagel formation starting with a cylindrical strip of dough to form a toroid, and thereafter rolling the formed toroid along a mandrel to further shape it.

The 1952 U.S. Pat. No. to Lehman 2,611,329 discloses a doughnut making machine utilizing an extrusion and reciprocating central disk to provide a cut off action to form a toroid, followed by rolling of the formed toroid along a mandrel to form an external skin for the toroid.

The 1953 U.S. Pat. No. to Roth 2,628,578 discloses a vertically extending mandrel about which is disposed four vertically running belts so that a lump of dough dropped downward between the central mandrel and the belts is carried downward by the belts and spread around the mandrel by the belts and deposited at the bottom on a conveyor which moves it out for further processing.

The 1954 U.S. Pat. No. to Gendler 2,666,298 discloses a bagel making device which first extrudes a lump of dough which is then severed and carried along a conveyor beneath a forming board which spreads the lump out into an elongated cylindrical strip of dough. The cylindrical strip of dough is then deposited on a conveyor in inverted U-shape and carried along and dropped down around a cylindrical mandrel which latter is also surrounded by a moving belt structure to form the dough strip into a continuous bagel shape.

None of these patents discloses a mandrel which is adjustable in both the vertical and horizontal direction and having the ridges as appear on the mandrel of the present invention. None of the prior art devices discloses a means designed to insure that the bagel dough is constantly kept rotating between the time it exits the pressure plate (referred to as a forming board in the discussion of Chwirut above) and the time it encounters the mandrel and is formed into a toroid.

The fact that the bagel or other dough material rolls along the mandrel means that the bagel produced by the mandrel of the present invention is more consistently symmetrical in shape, has a yield of about 99.5% commercially acceptable bagels which is significantly above the percentage yielded by prior art mandrels, and the cross-section of the bagel is more nearly circular than if the bagel were permitted to slide along the surface of the mandrel. If the bagel slides, the hole through the center of the bagel would have a flattened surface rather than circular.

BRIEF SUMMARY OF THE INVENTION

The present invention consists of an improvement in the design of mandrels commonly used in machines which form toroids from a plastic material such as bagel dough.

In such machines of the prior art, the mandrel is commonly suspended so that it is located within a cylindrical chamber. Dough is forced down and around the mandrel through the cylindrical chamber in such a manner as to produce a toroid, as well known in the industry. Unless the mandrel is precisely centered, the toroid will not be symmetrical. A non-symmetrical toroid also results if the toroid is allowed to slide or slip along the surface of the mandrel. Slipping may also cause the hole of the bagel to have flat sides, as a cylinder has, rather than a circular cross-section as a true toroid has.

It is the object of the mandrel of the present invention to (a) provide a surface which will keep the bagel dough rotating at all times after exiting the pressure plate and will not allow the toroid to slide and further to (b) provide a mandrel which is easily adjusted in the horizontal, as well as vertical, direction so as to be easily centered in the cylindrical chamber, thereby producing consistently symmetrical bagels, at a yield of over 99%.

The first object of the invention is met by fitting the mandrel with a plastic tubular cover having a series of ridges on its surface oriented so as to circumscribe the exterior cylindrical surface of the cover. When the plastic material encounters a ridge, the ridge provides increased resistance to the motion of the plastic material on its inner circular surface thereby inducing the plastic toroidal material to rotate as it proceeds along the mandrel rather than sliding along the mandrel.

For that portion of travel of the bagel dough between the exit from the pressure plate to the encounter with the mandrel, the first objective is achieved by use of a tapered plate. Without the tapered plate the bagel dough does not rotate during this portion of its travel and there is no pressure being applied to the dough. Because of the motion of the endless belt and the upward curvature of its edges this lack of pressure on the bagel can result in deformations which cannot be completely cured by the kneading action of the ridged mandrel. The wide end of the tapered plate is as wide as the adjacent end of the pressure plate, this tapered plate therefore applies pressure over a wide portion of the cylindrical piece of bagel dough, causing it to rotate and maintain its cylindrical shape while it travels from the pressure plate to the mandrel. At no time is the bagel dough allowed to slide.

The second object of the invention is met by the support mechanism to which the mandrel is attached, and by which the mandrel is suspended within the cylindrical toroid forming chamber. This mechanism, by means of bolts and screws, is adjustable both vertically and horizontally, thereby permitting accurate centering of the mandrel within the cylindrical chamber.

For a more complete understanding of the present invention and further objects and advantages thereof, reference is made to the following figures.

DESCRIPTION OF THE DRAWINGS

FIG. 3 is a frontal sectional view of the toroid forming machine illustrating the location and function of the mandrel and its supporting structure.

FIG. 4 is an end view of the mandrel and its support.

FIG. 5 is a top view of the end of the mandrel which is first encountered by the plastic material, showing the position and shape of the tapered plate.

FIG. 6 is a sectional view of the end of the mandrel shown in FIG. 5.

FIG. 7 is a detail view illustrating the interaction of the ridges of the mandrel and the endless belt to induce a rotation of the plastic material as it travels along the mandrel.

DESCRIPTION OF THE PREFERRED EMBODIMENT

Figure 1:
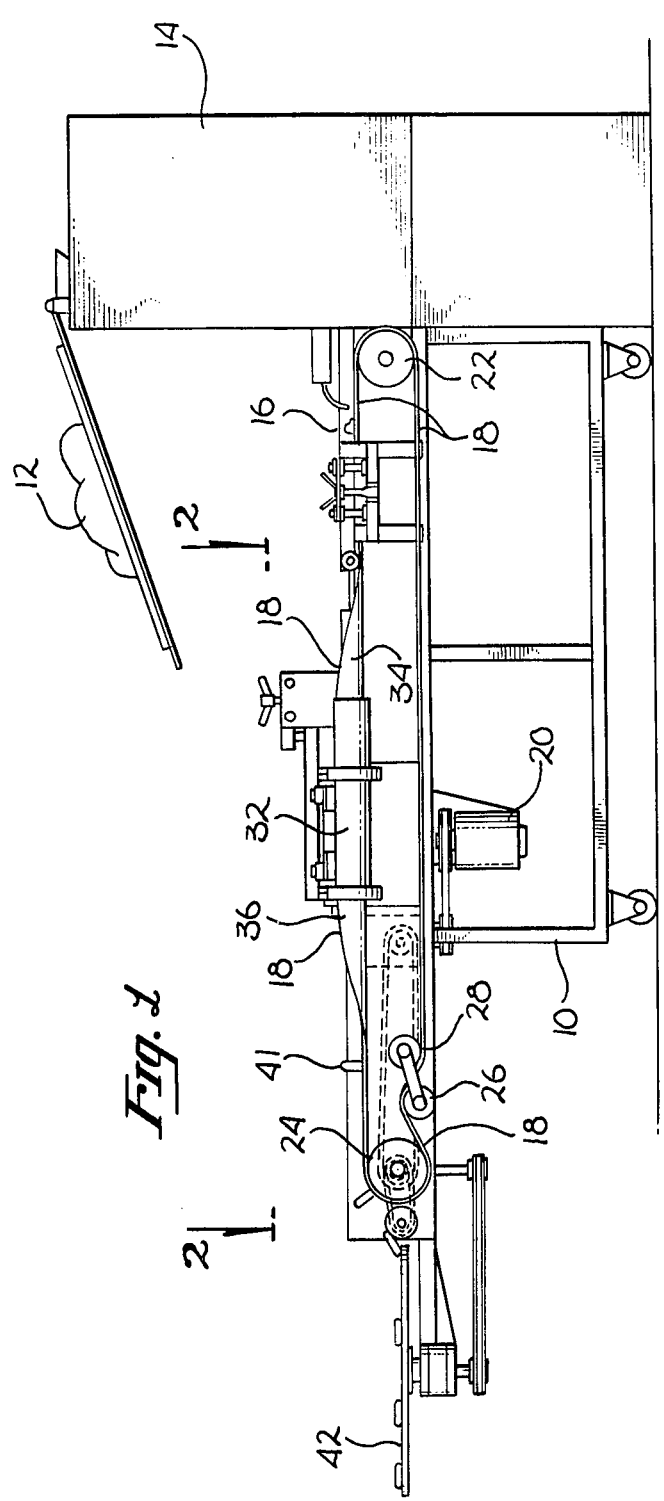
FIG. 1 is a plan view of the overall machine in which the present invention is utilized.

The mandrel of the present invention is designed to function in a device similar to that shown in FIG. 1. The mandrel is preferably made of anodized aluminum so that impurities do not contaminate the bagel dough thereby turning the dough black from contact with the mandrel, as occurs with prior non-anodized aluminum mandrels, but can also be made of plastic The device, which forms a toroid from a lump of plastic material such as baking dough, is mounted upon a wheeled frame 10.

The general operation of such a device can be described in the following manner. A mass of dough 12 is deposited into the device 14 which separates the mass 12 into small lumps 16 suitable for use in the toroid making apparatus. The small lump 16 is automatically placed upon an endless belt 18 which is driven by motor 20 around a series of suitably placed cylindrical drums 22, 24, 26 and 28.

As the small lump 16 is conveyed by the endless belt 18, it first encounters pressure a plate 30 (not visible in FIG. 1, shown in FIG. 2) spaced above the belt 18 such that as the lump 16 passes between the pressure plate 30 and belt 18 it is given a cylindrical shape and oriented such that its length is perpendicular to the length of the belt 18.

A hinged metal cylindrical housing 32 surrounds the endless belt 18 causing the belt to assume a nearly cylindrical shape with its edges slightly separated at their highest point. This housing is longitudinally spaced from the pressure plate 30 allowing the belt 18 to gradually assume its cylindrical shape as it travels from the pressure plate 30 to the housing 32. The gradual change in shape is illustrated at 34. The belt gradually returns to its flat shape as it exits the housing as illustrated at 36, and resumes its endless travel around the cylindrical drums 22 and 24.

Figure 2:
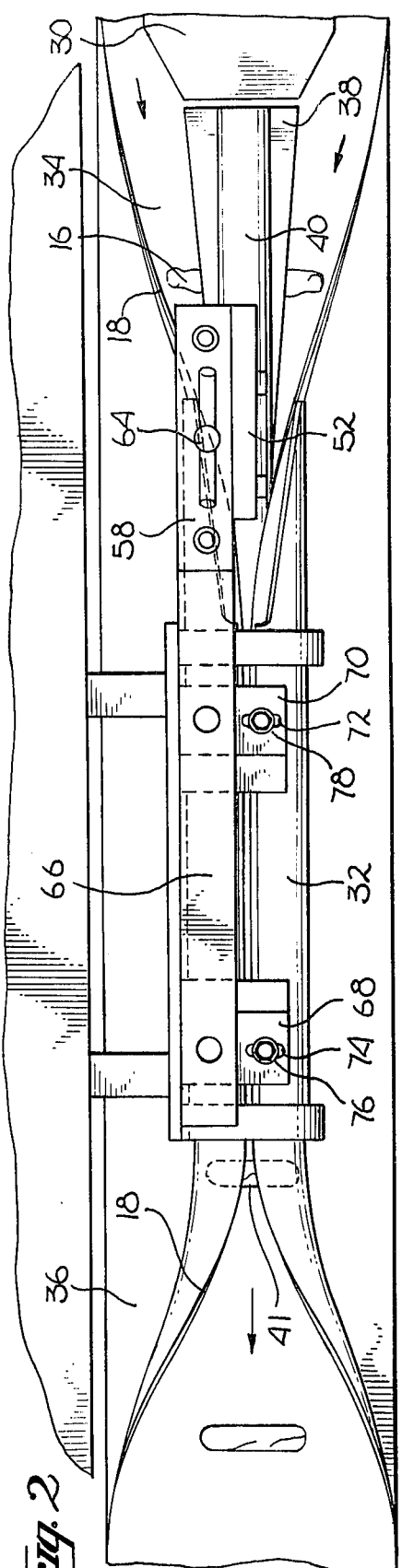
FIG. 2 is a top view, in some detail, of the specific portion of the machine of FIG. 1, which employs the present invention.

A mandrel is placed longitudinally within the cylindrical portion of the travel of the belt, as shown in FIGS. 2 and 3. The mandrel is adjusted so that it is as nearly centered as possible. When properly centered a toroid, such as a bagel, is produced as illustrated by the following sequence. The cylindrical piece of dough encounters the rising portion 34 of the endless belt 18 as it exits pressure plate 30, and also at this time encounters the tapered plate 38. This tapered plate is fastened to the underside of the mandrel 40 and serves to keep the dough rotating and in contact with the endless belt while the sides of the belt are gradually rising. As the lump of dough 16 approaches the cylindrical portion of the belt 18, the dough is forced to occupy the annular space between the mandrel 40 and the belt 18. The ends of the lump of dough eventually meet and give the lump of dough a toroid shape as shown at 41. Because of the rolling action imparted to the toroid by the ridges of the mandrel of the present invention, the joint where the two ends meet is nearly invisible in the finished toroid as it exits the cylindrical portion of the belt 18. The toroid is forced off the end of the mandrel and passes through that portion 36 of the belt 18 which gradually returns to its flat position upon exiting the cylindrical housing 32. The toroid proceeds along the travel of the belt, to where it falls off as the belt begins its return, and is deposited onto a rotating collection platform 42 shown in FIG. 1.

Now that the operation of the overall machine is understood, applicant will describe the details of the preferred embodiment of the mandrel of the present invention.

The details of operation and construction of the mandrel are most clearly shown in FIGS. 2 through 7.

FIG. 2 illustrates that portion of the mandrel, closest to the pressure plate 30, which is first encountered by the lump of dough 16. The taper of the plate 38 which is fastened to the mandrel 40 is such that the widest portion is closest to pressure plate 30 and the narrow portion is near the cylindrical housing 32. This tapered plate 38 has a flat bottom that serves to keep the center portion of the cylindrical lump of dough in contact with a large surface area so that it is caused to rotate and thereby maintain its cylindrical shape as the dough enters the curved portion 34 of the belt 18.

FIG. 3 is a cutaway view more clearly showing the features of the mandrel 40. This figure shows the tapered plate 38 which is fastened to the mandrel 40 by means of screws 44, 46 and 48. Over the opposite end of the mandrel 40, that is, over the portion of the mandrel which extends within the cylindrical housing 32, is placed a tubular member 49 which has, integrally formed on its outer surface, a series of longitudinally spaced ridges 50. The tubular member 49 can be made of plastic or any other suitable material such as will resist corrosion, facilitate cleaning, and not warp. This tubular member 49 is appropriately secured to the mandrel as by bolt 51.

Also secured to the mandrel is a vertical plate 52, secured at its lower end by screws 46 and 48 to the upper surface of mandrel 40. Plate 52 serves to suspend the mandrel 40 within the cylindrical housing 32 and inside the endless belt 18. Plate 52 is in turn securely fixed at its upper end by bolts 54 and 56 to member 58. Member 58 is slideably located upon vertical guide posts 60 and 62. Member 58 can be moved upward or downward along guide posts 60 and 62 by rotating member 64. Member 64 is threadably interconnected with member 58 such that when member 64 is rotated, member 58 is raised or lowered which in turn raises or lowers the mandrel 40.

Guide posts 60 and 62 are permanently affixed at their lower ends to horizontal beam 66. The lower end of threaded member 64 is attached to beam 66 so as to permit rotation and prohibit vertical movement of member 64.

FIG. 4 shows the spatial relation of the mandrel 40 to the vertical plate 52 and member 58. The operation of member 64 with respect to member 58, guide post 60 and horizontal beam 66 is also more clearly illustrated in FIG. 4.

Beam 66 is fixedly attached to plates 68 and 70. Each such plate is supplied with a slot 74 and 72 respectively (shown in FIG. 2) which extends horizontally outward from the beam 66 and perpendicular to the longitudinal centerline of the mandrel 40. Bolts 76 and 78 are each passed through the slots 74 and 72 and thus plates 68 and 70 are anchored to the stationary framepiece 80. By loosening bolts 76 and 78, the horizontal location of the beam 66 (and hence the horizontal location of member 48, plate 52 and mandrel 40) can be adjusted so as to horizontally center the mandrel 40 within the cylindrical housing 32.

When the mandrel 40 and ridged tubular member 49 are centered within the cylindrical housing 32, by means of the above described adjustable support mechanism, the toroids produced by virtue of the machine are uniformly symmetrical, producing a commercially acceptable toroid approximately 99.5% of the time.

FIG. 5 is a detail view of the end of the mandrel first encountered by the lump of dough 16. The edges of the endless belt 18 are separated by a slight gap 82 at their closest approach to one another inside the cylindrical housing 32. The mandrel 40 is suspended from vertical plate 52. The lump of dough 16 proceeds from the pressure plate 30, through the gradually curving portion 34 of the endless belt 18 and at some point beyond the left end 84 of plate 52 the ends of the cylindrical lump of dough are brought together and joined to form a toroid. As the toroid proceeds further in its travel toward the left end of mandrel 40 (in the direction of arrow 88) it encounters the series of spaced ridges 50 which cause the toroid to rotate in the direction of the arrows 86 as shown in FIGS. 3, 6 and 7.

FIG. 6 is an end view of the mandrel 40, as it is first encountered by the lump of dough 16. The placement of tapered plate 38 helps to keep the lump of dough in contact with a surface of sufficient area such that the lump of dough is caused to rotate and the cylindrical shape of lump 16 is maintained. Other members are identified for easy correlation with prior figures.

FIG. 7 is a detail view illustrating the function of the ridges 50. Arrow 88 shows the direction in which the endless belt 18 moves. The motion of the belt 18 causes the lump of dough 16 to move in the direction indicated by arrow 90. As the lump of dough moves with respect to the stationary mandrel it encounters the spaced ridges 50. This encounter results in the application of a force near the top (as viewed in FIG. 7) of the lump of dough in a direction opposite to the direction of motion of the endless belt 18. The force applied to the dough by the belt and the force applied by the ridges produce a force couple which causes the lump of dough to rotate, as indicated by arrow 86. It is this rotation of the lump of dough which prevents the lump of dough from sliding or sliping along the tubular member 49, thereby producing consistently symmetric toroids.

While the above described mandrel, tubular member and tapered plate are all separate members, it is considered obvious that the same function could be served by a unitary structure having substantially the same shape as the shape of the combination of the mandrel, tubular member and tapered plate. Such a unitary structure could be made of plastic, nylon, teflon or any other material suitably rigid, warp free, and free of corrosion and impurities which might contaminate the bagel dough.

Having thus described the mandrel of the present invention, it should be readily apparent that many changes and modifications can be made thereto without departing from the scope of the invention. It is intended that all such changes be considered to be within the spirit and scope of the invention as herein disclosed.

I claim:

1. In a machine, commonly used for forming a toroid from a lump of plastic material such as baking dough, comprising a frame, an endless flexible belt supported by said frame, said belt operated to carry discrete pieces of plastic material along a translatory path, means driving said endless flexible belt, means supported by said frame to cause said endless flexible belt to gradually assume a substantially circular cross sectional form and subsequently gradually resume a flat position, a pressure plate for forming said lump of plastic material into a cylindrical, a mandrel supported centrally above the endless flexible belt and extending axially into the cylindrically shaped portion of the belt, the improvement comprising;

a tapered plate having a flat bottom and a wide end wider than the diameter of said mandrel and a narrow end, said tapered plate being supported above the endless belt such that the plastic material encounters the wide end of the tapered plate first; said tapered plate gradually fairing into the shape of the underside of the mandrel at the narrow end of the tapered plate such that the mandrel and tapered plate combination present a smooth surface to the plastic material as it moves beneath the tapered plate and mandrel joint.

2. The improvement according to claim 1 wherein the tapered plate extends from the pressure plate to the mandrel.

3. The improvement according to claim 1 wherein the tapered plate is coupled to the mandrel.

4. The improvement according to claim 1 wherein the tapered plate is made of one of the substances from the group of teflon, nylon, anodized aluminum and plastic.

* * * * *